(12) United States Patent
Ravin et al.

(10) Patent No.: US 7,865,457 B2
(45) Date of Patent: Jan. 4, 2011

(54) KNOWLEDGE MANAGEMENT SYSTEM AUTOMATICALLY ALLOCATING EXPERT RESOURCES

(75) Inventors: Yael Ravin, Mount Kisco, NY (US); James J. Sharpe, Morton, IL (US); Edith H. Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 10/926,154

(22) Filed: Aug. 25, 2004

(65) Prior Publication Data

US 2006/0047615 A1 Mar. 2, 2006

(51) Int. Cl.
*G06N 5/00* (2006.01)
(52) U.S. Cl. .......................................... 706/46; 706/45
(58) Field of Classification Search .................. 706/46, 706/45; 715/716; 600/300; 714/4; 705/50
See application file for complete search history.

(56) References Cited

U.S. PATENT DOCUMENTS

| | | | | |
|---|---|---|---|---|
| 5,862,223 A | * | 1/1999 | Walker et al. | 705/50 |
| 6,671,818 B1 | * | 12/2003 | Mikurak | 714/4 |
| 6,849,045 B2 | * | 2/2005 | Iliff | 600/300 |
| 6,850,252 B1 | * | 2/2005 | Hoffberg | 715/716 |
| 7,139,390 B2 | * | 11/2006 | Brown et al. | 379/265.02 |

* cited by examiner

*Primary Examiner*—Wilbert L Starks, Jr.
(74) *Attorney, Agent, or Firm*—Law Office of Charles W. Peterson, Jr.; Louis J. Percello, Esq.; Brian P. Verminski, Esq.

(57) ABSTRACT

A knowledge management system allocating expert resources, method of allocating expert resources and program product therefor. Information requests are provided over networked devices, e.g., over voice and data networks. Data on experts may be stored in an expert database and data on requesters stored in a requestor database. A pairing unit identifies an appropriate expert matched to each request and requestor. The pairing unit includes a request/requestor characterization unit collecting request/requestor attributes, a matching unit matching request/requestor attributes with an expert, and a routing unit routing each incoming request to a selected matching expert.

36 Claims, 6 Drawing Sheets

KNOWLEDGE MANAGEMENT SYSTEM AUTOMATICALLY ALLOCATING EXPERT RESOURCES

BACKGROUND OF THE INVENTION

1. Field of the Invention

The present invention is related to knowledge management systems and more particularly to efficiently allocating expert resources in knowledge management systems.

2. Background Description

As the knowledge economy has grown, people are seeking information to assist with their jobs, personal lives or with life-long learning. However, while more information has is available, it is also more widely distributed, e.g., geographically, across businesses, and/or across a number of experts specializing in different areas. A number of approaches have been used to connect people seeking information with experts and/or educational services. For example, typical state of the art search engines produce a hitlist ranking the information objects matching a query from best match to poorest match and, hopefully, ranking the hits as to their match to the query. State of the art answering services attempt to provide succinct answers (usually only one) to a specific question based on linguistic analysis; here the incoming queries tend to be full sentences. These answering services provide a more specific match, matching semantic or grammatical structure in the question to other semantic or grammatical structures in information objects. State of the art "expertise location" systems automatically identify an expert in a given field that can answer queries in that field, e.g., the IBM Lotus Knowledge Discovery Engine. Also, many state of the art help desks include an automatic queuing system that directs queries to appropriate queues or experts, typically, matching the content of the query to an expert profile.

Unfortunately, typically such state of the art approaches either connect information seekers with experts manually or, are not very selective in matching experts. Currently, only very general factors are considered in automatically matching queries and experts and, therefore, providing a very general pairing, but certainly not the best match possible. Worse still, these approaches frequently have resulted in skill mismatches between the requester and answering expert, e.g., where the educational level of one is much higher than the other. So, for example, a freshman may ask a standard textbook question that is fielded by full professor at a college doing advanced research in physics. An upper-classman or a graduate student would suffice for this type of question but a full professor is overkill.

Thus, there is a need for an efficient allocation of expert resources in knowledge management systems.

SUMMARY OF THE INVENTION

It is a purpose of the invention to efficiently allocate expert resources in knowledge management systems;

It is another purpose of the invention to identify a suitable expert for each request for assistance to adequately respond to the request at a level of understanding commensurate for the requester;

It is yet another purpose of the invention to provide an expert that can respond to request at a skill level matched to the skill level of the requestor;

It is yet another purpose of the invention to provide expertise for ad-hoc queries based on dynamic user profiles as well as dynamic expert profiles, thereby pairing requests and requesters with corresponding experts at a corresponding expertise level;

It is yet another purpose of the invention to optimize knowledge management resources such that the skill level of each requestor as well as the difficulty level of the requests is addressed by an expert with an appropriate level of expertise, while minimizing knowledge management resource waste from pairing such requests/requestors with overqualified or underqualified experts.

The present invention relates to a knowledge management system allocating expert resources, method of allocating expert resources and program product therefor. Information requests are provided over networked devices, e.g., over voice and data networks. Data on experts may be stored in an expert database and data on requesters stored in a requestor database. A pairing unit identifies an appropriate expert matched to each request and requestor. The pairing unit includes a request/requestor characterization unit collecting request/requestor attributes, a matching unit matching request/requestor attributes with an expert, and a routing unit routing each incoming request to a selected matching expert.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
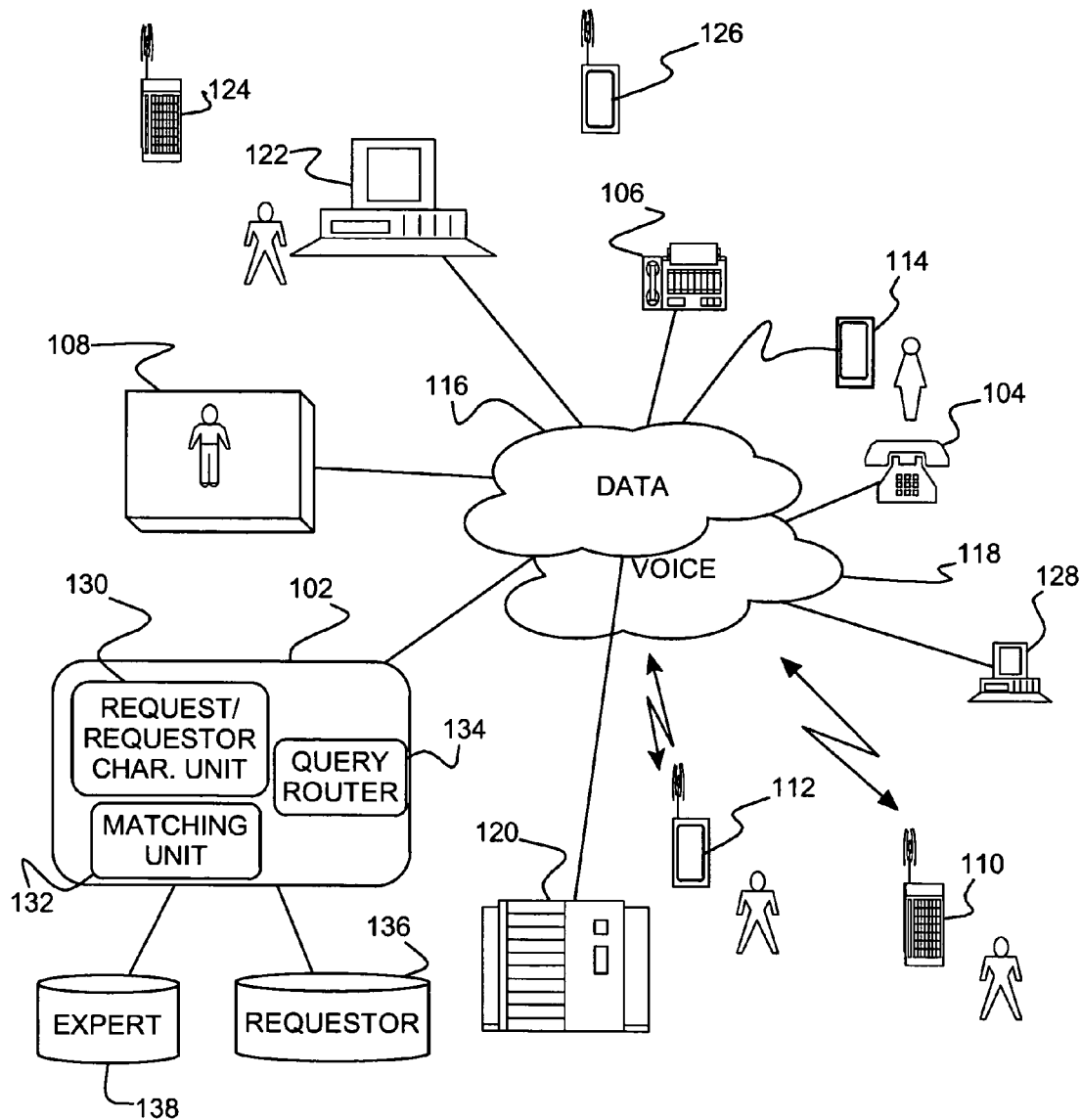
FIG. 1 shows a example of an knowledge management system capable of providing access to an expert of an appropriate skill level and matched to the needs of each user or requestor according to a preferred embodiment of the present invention.

Turning now to the drawings and, more particularly, FIG. 1 shows an example of a knowledge management system 100 according to a preferred embodiment of the present invention that is capable of providing access to an expert of an appropriate skill level matched to the needs of each user. The preferred system 100 of this example includes a requestor/expert pairing unit 102 matching requests from a particular requestor with an expert of an appropriate skill level. Requestors can communicate (send queries/receive responses) with the requestor/expert pairing unit 102 telephonically, e.g., using an appropriate telephonic or data communications device 104, 106, 108, 110, 112, 114. The communications devices 104, 106, 108, 110, 112, 114 connect over a suitable communications network (e.g., a digital or data network 116 such as the Internet and/or a typical analog network or a suitable public telephone network 118) to the requestor/expert pairing unit 102. In addition, an optional call center 122 may be staffed by experts that receive the requests and, generally, using either or both data and voice capable devices 124, 126. Optional voice termination point 120 acts as a termination for calls delivered either from the public telephone network 118 or through voice over Internet protocol (VOIP) communications. Termination point 120 also may serve to provide physical routing of calls to an expert, once the expert is determined. Furthermore, remote systems 128 may connect to/be connected to the system 100, e.g., by modem (not shown) over the Internet 116.

The requestor/expert pairing unit 102 includes a request/requestor characterization unit 130 extracting request/requestor attributes, a matching unit 132 matching each request/requestor with an appropriate expert based on extracted attributes and a query router 134 routing queries to matched experts. Also, data collected on individual requestors, e.g., attributes from previous requests, are stored in a requestor database 136. For example, such data may include subscriber profiles and preferences, subscriber request history, subscriber feedback, expert feedback regarding subscriber capability. Similarly, an expert database 138 includes data on available experts and may be used to determine an appropriate expert to handle requests in response to request/requestor attributes. Expert data may include, for example, expert capabilities, expert profiles and preferences, credentials, history, customer satisfaction ratings, availability, and/or pay scale. The request/requestor characterization unit 130, matching unit 132, query router 134, requestor database 136 and expert database 138 may be centrally located, e.g., on the same central server or, distributed amongst a number of independent computers or personal computers (PCs) that may be distributed geographically and networked together, e.g., over the Internet 116.

In this example, the communications devices include typical voice only telephones 104, fax machines 106, televisions 108 (e.g., with a set top box and modem interface (not shown). Cell phones 110 and cell phone based web enabled devices 112 also connect over any suitable wireless capable network, e.g., PSTN 118. Typical data input/output (I/O) devices, such as a personal computer 112, personal digital assistant or tablet computer 114 or any other suitable text or voice capable digital device communicate over the digital network 116, e.g., through a wired local area network (LAN) adapter or wireless data network adapter, such as an Institute of Electrical and Electronics Engineers (IEEE) 802.11b protocol LAN adapter. Furthermore, the digital network 116 may be any suitable corporate or private network (also referred to as an intranet), the Internet or any combination thereof. If included, the optional call center 122 provides physical call routing to an appropriate expert or operator once the requestor/expert pairing unit 102 identifies such an expert or operator.

The optional call center 122 may be any suitable such enterprise call center 122 or telecom service capable of routing an incoming call, e.g., to an Automatic Call Distributor (not shown), that can forward the call to one of a number physical telephones. When a call is routed to an enterprise call center 122, a customer relationship management facility (not shown) typically uses the caller line ID to identify the customer and presents the expert operator with a record of the customer's history with the enterprise. Operators can forward requests to any experts with network connectivity, who can receive the data queries and voice from self-selected locations. Further, the call center 122, if included, may have both data and voice capability for call center experts to receive the incoming requests, receive trouble reports, or for other information (e.g., directory assistance). So, the optional call center 122 provides a mechanism where operator experts can respond to requests with expert information and/or provide services through a single phone number.

The requestor/expert pairing unit 102 may receive requests transmitted as data, by voice, e.g., using voice recognition or, from manually transcribed voice requests. The request/requestor characterization unit 130 may draw on requestor data from requestor database 136 or in one or more external systems 128. External Systems 128 may contain data not owned by the system, including but not limited to dynamic data regarding the requestor, e.g., courses taken, grades in courses taken, publications, chat room transcripts, web log (blog) information. Matching unit 132 responds to information about available experts that may be resident in expert database 138 or, also optionally, from external systems 128. Examples of such information about experts include courses taught, publications, recent talks and media appearances. The matching unit 132 provides an indication of a selected expert to query router 134, which routes the request accordingly. The request may be routed, for example, to error processing, as a voice call, as data packets, as a message to the requestor with an address or appointment for the determined expert.

In a comparative example, students, e.g., a new computer science freshman and a graduate student, each provide questions regarding web services security. Previously, services would respond to all such requests substantially identically by directing each call to an expert or to a queue for such an expert. An expert that is a good match for the graduate student, already knowledgeable about web services, may be overkill for a freshman with much more basic questions, i.e., explaining basic web services to a novice requires much less skill than explaining the details of security on web services. Thus, previous such services were inefficiently using experts' time and, possibly intimidating requesters, e.g., providing answers that may be overly simplified or couched in too complex terms for the requesters. By contrast, such services provided by a preferred embodiment system, e.g., 100, matches experts with the requestors' level of experience to assure an efficient use of resources, e.g., a graduate student requestor is identified as knowledgeable and, requests are directed to a matching expert; similarly, a freshman is identified as a novice (e.g., by courses currently taken) and, requests are directed to a lesser skilled expert or an expert skilled in responding to novice inquiries.

Figure 2:
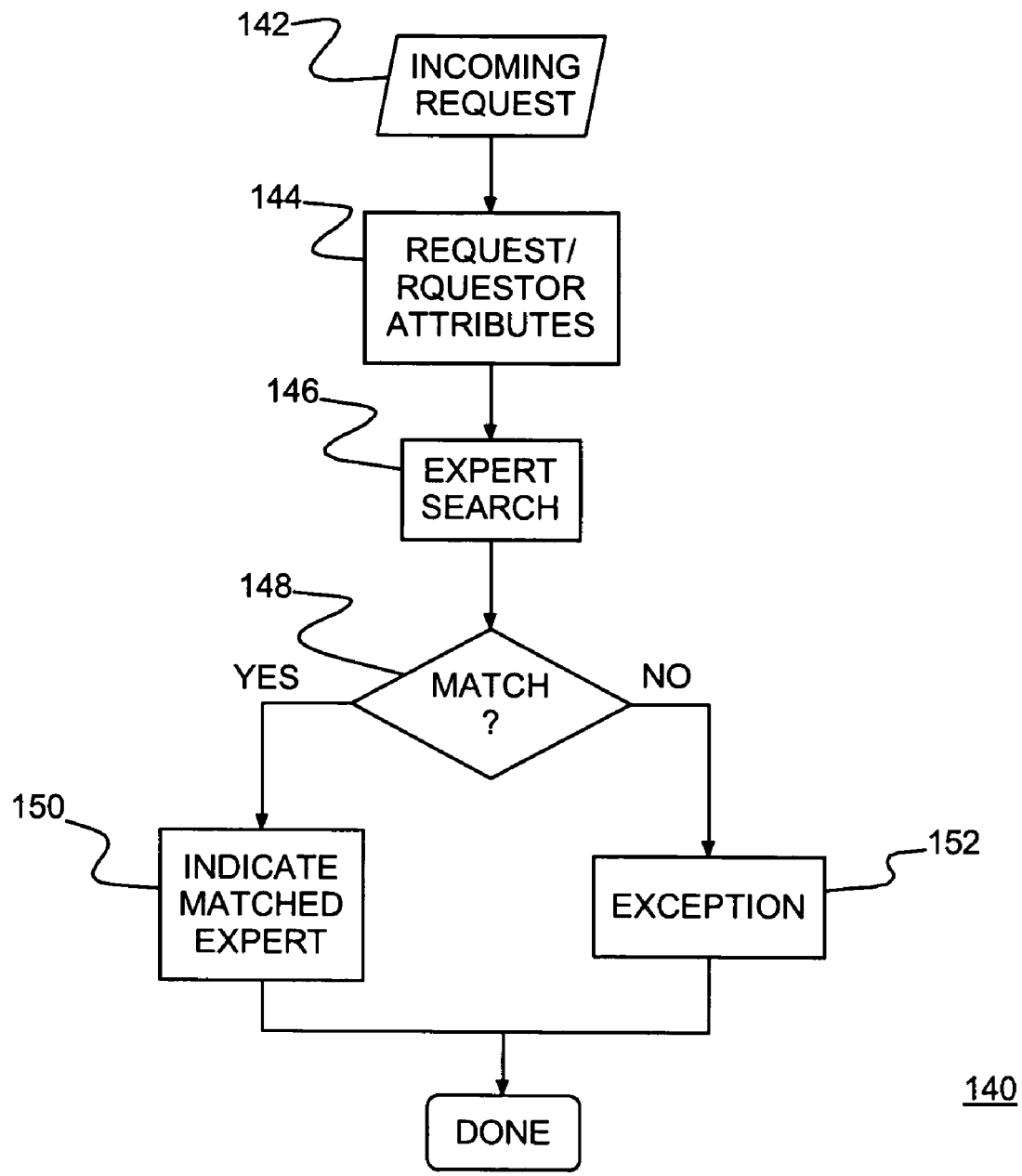
FIG. 2 shows a flowchart example of matching request/requestors with experts of appropriate skill level.

FIG. 2 shows a flowchart example 140 of matching request/requestors with experts of an appropriate skill level (e.g., by requestor/expert pairing unit 102 in FIG. 1) according to a preferred embodiment of the present invention. First, in step 142 a request is received from a requestor. In step 144 the request is passed to the request/requestor characterization unit 130 for attribute extraction. After attributes are extracted, the matching unit 132 pairs the request/requestor with available experts in step 146 comparing experts against the extracted attributes. If a match is found in step 148, then the query router 134 routes the request in step 150, e.g., passes to the requestor contact information on the matching expert. The query router 134 may provide such an indication in any suitable fashion, for example, sending an e-mail to the requestor, supplying an address, providing a notification or other data, audible, or visual indication. Further, the query router 134 may forward at least some data concerning the request-requestor pair to the expert. Thus, in this example the expert may provide an acknowledgement to the requestor. Optionally, the expert can respond by answering the request. If in step 148, however, an expert is not identified from currently available expert data; then, in step 152 an exception is processed, e.g., to find an otherwise acceptable best match. Such exception processing 152 may include, for example, but is not limited to passing an error message to the requestor, passing an error message to the organization associated with the requester, exception logging, forwarding a query to an outside agency in search of an appropriate expert, forwarding such a query to a financial transaction (e.g., where the result of the error triggers a reimbursement for a failed service level agreement) determining the most appropriate expert (e.g., where the closest hit falls short of the threshold).

So, requests provided in step 142 may be individual requests from single requestors or, a batch of requests may be provided from a number of requestors, e.g., from requesters that are geographically proximate or from requesters at a single entity such as a school or an enterprise. Further, requests may be relayed, e.g., through an information technology (IT) intermediary, such as a search engine, a proxy or, an intelligent agent. Preferably, individual requests contain information indicating the source of the request and for any request not containing such origination, the IT entity that issued the request is taken as the requester. Furthermore, any suitable communications medium may be used for conveying requests which may be provided directly or indirectly. Using suitable communications media may include placing the requests, for example, textually over data network, verbally or vocally over a wired or wireless communications network, or visually (e.g., iconically, textually and/or verbally or a combination thereof) through a kiosk or any device 104, 106, 108, 110, 112, 114 attached to a preferred system 100. Textual requests may be freeform and unconstrained or unstructured, e.g., in an e-mail that may or may not be parsed. Further, requests may be web based, e.g. through access a particular web page, and in response to its content (e.g., screenscraping a WIKI or, in a structured format, as entered into a form or a structured web page. Requests may be provided digitally, e.g., typed or handwritten on a PDA, or requests may be written or printed physically on paper or fax and scanned using suitable optical character recognition software. Vocal or verbal requests may be received from a standard telephone or a microphone attached to a computer, for example, and converted to a computer usable format, e.g., using suitable voice recognition such as Via Voice from International Business Machines (IBM) Corporation. Further, voice requests may be subject to speaker biometrics analysis e.g., emotional analysis or speaker identification. Finally, incoming requests may be subject to any suitable additional necessary processing, including but not limited to, machine language translation and machine semantic processing.

Figure 3:
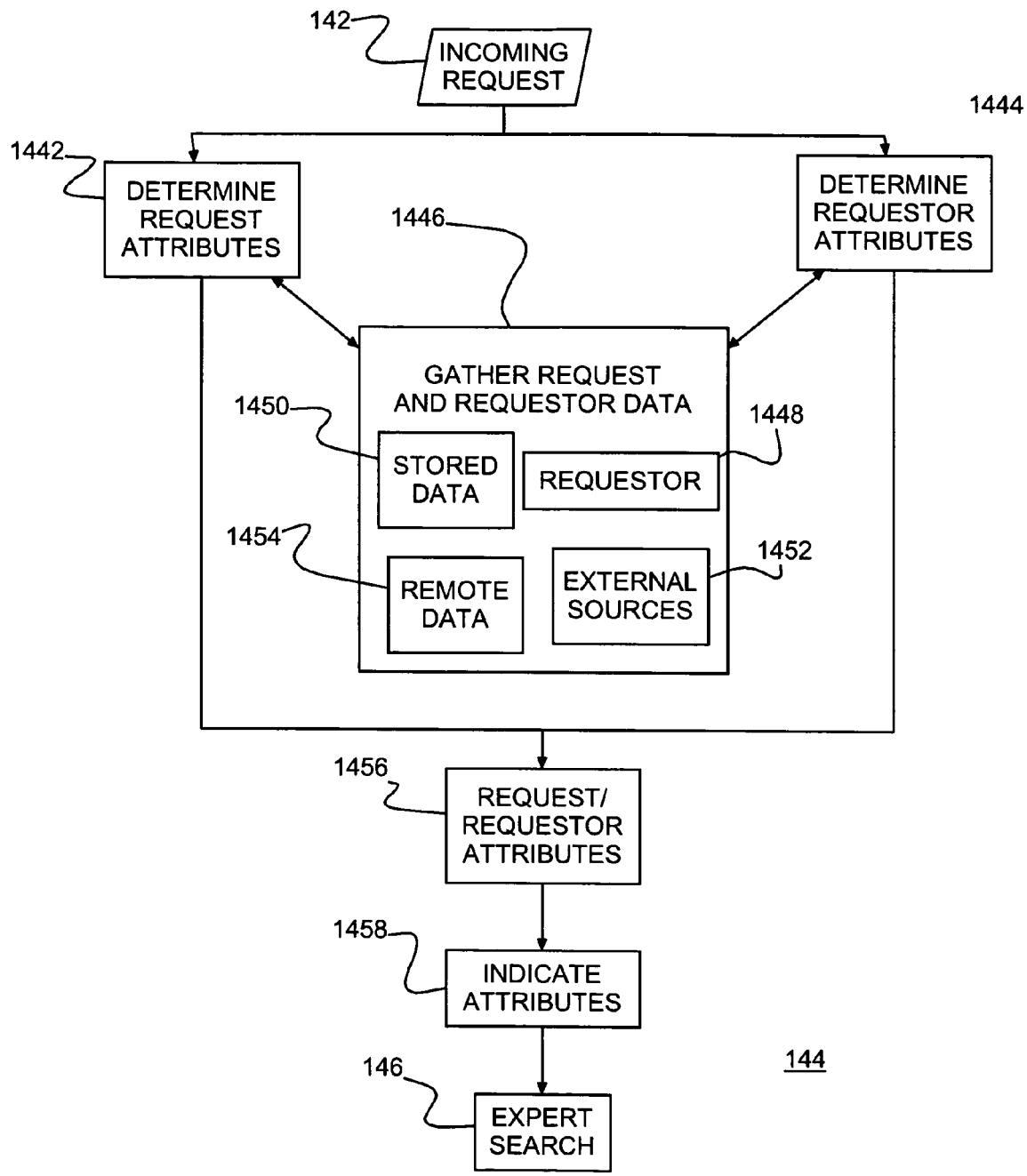
FIG. 3 shows a block diagram example of step in determining request/requestor attributes by a request/requestor characterization unit and that analyzes both the request and the requester for attributes.

FIG. 3 shows a block diagram example of step 144 in determining request/requestor attributes by a request/requestor characterization unit 130 according to a preferred embodiment of the present invention. The request/requestor characterization unit 130 analyzes both the request and the requestor for attributes and combines the analysis results to derive request/requestor attributes. Such request/requestor pair attributes may include, for example, but are not limited to the domain of inquiry, an anticipated requestor skill level within this domain of inquiry, the anticipated response duration, the value of a response to the requestor (e.g., for value pricing). First in step 1442 the request is analyzed to determine request attributes. In step 1444 the requestor data is analyzed to determine requestor attributes. As part of the analyzing in step 1442 and 1444, in step 1446 data is gathered about the request and the requestor that may include requesting information from the requestor 1448, accessing locally stored data 1450, accessing remote data sources 1452, mining external data sources 1454 or, simply collecting information from the request. Once request attributes and requestor attributes have been analyzed, in step 1456 the analysis results are combined to determine unique attributes for the request as paired with the requester. In step 1458 attributes representative of the request/requestor pair is provided to the query router 134.

Request analysis step 1442 may include, for example, but is not limited to semantic analysis, language analysis, analysis for emotional content, comparison to historic data including previous or similar requests. Request attribute determination can include but is not limited to determining request topic, determining request language, determining the degree of difficulty of responding to the request, determining the required time anticipated for answering, determining user urgency, determining the value of the answer. For example, an indication of the degree of difficulty may be derived by measuring the grade-level equivalence of the query terms. In another example, emotional content may be gleaned from the request from including words and grammatical structures that are usually used to express certain emotions. Further, request analysis in step 1442 may be completed in near real time; or, off-line and accomplished with few constraints on processing time.

So in particular, various suitable information retrieval methods may be used to match the request to a pre-existing categorization of domains found in the system, e.g., in data gathering step 1446. Various known similarity measures can be applied to associate the incoming request with the closest pre-established domain category or categories. This may be done, for example, by comparing the request to signatures that are associated with categories, as described in further detail hereinbelow. Any request that is close enough to one of the signatures is associated with a corresponding domain. If a request is not close enough, it may be routed to a human to determine whether the request expresses a novel domain. Likewise, additional information regarding an unmatched request can be requested from the requestor in step 1448.

Linguistic or semantic analysis may be used to determine attributes indicating the specifics of the request, e.g., what type of answer is required, a bibliographic reference, a date, a person name and etc. Such analysis may gauge the time required for responding to the request. Language complexity measurements may be used to determine attributes related to the level of difficulty of the request and, therefore, to infer the level of expertise of the requester, e.g., determining a grade or an education level associated with the query. Similarly, more specific measurements may be developed for each domain. For example, the presence of certain vocabulary items a query may indicate a certain level of sophistication of the part of the requestor in the domain. In another example, a phrase like "inverted index" may describe search engine operation demonstrating a level of expertise within the domain beyond that of a layperson. Incoming requests may be compared to previous requests from the same requestor that have been already analyzed. Attributes of each new request may be inferred from similar previously processed requests. Also, attributes of domain category and level of expertise may be measured and validated by this comparison. In addition, experts may be suggested and/or selected based on the similarity to other past requests. Attributes can be derived from a simple analysis of characters and occurrence patterns (grammar, syntax, idioms and etc.) in an incoming request that indicate the language or languages of the request. These patterns can provide a basis for suggesting a preferred response language. Further, the request language may provide a basis for determining whether the requestor's native language is different than that of the request and, so, may be used to infer the requestor's native language, e.g., by identifying and analyzing particular grammatik or semantic patterns. The results of any analysis may provide criterion for determining the response language or for validating the response language with the requestor. Also, emotional content in the request can be derived with linguistic analysis, e.g., detecting urgency, anger, or impatience in the request. Such linguistic analysis can establish attributes including the urgency of the request or a level of existing customer dissatisfaction and, that may be used in response to place constraints on scheduling the response or the selection of experts.

Requestor analysis in step 1444 may include obtaining requestor data and attributes in 1446 in any suitable manner. Some requester data (such as level of expertise or native language) may be determined with respect to input gathered from the request text in step 1442. Additional requestor information may be gathered in step 1446, sequentially or iteratively, collecting data from multiple sources 1448, 1450, 1452 and/or 1454, until all required information is accessed. So, for example, the requestor data may be collected interactively (e.g., quizzing the requester) in 1448; data may be gathered by accessing stored data regarding the requestor in 1450, e.g., profiles and preferences or previously asked questions; data may be gathered by accessing remotely stored data regarding the requestor in 1452 (e.g., university records stored); or retrieved from a contemporaneous web search in 1454. Further, in some cases the requestor's attributes may be derived from analyzing similar requestors for appropriately similar attributes.

Preferably, stored data 1450 is accessed first, e.g., accessing data from previous interactions with the requestor. Requestor attributes can be, but are not limited to, language preference, preferred response medium, level of expertise in the request domain and in other domains, level of education of the requester, and measure of satisfaction. If previous interactions with the requestor indicate, for example, a greater-than-average level of dissatisfaction, then, an indicator of potential dissatisfaction may be attached to the request-requestor pair. Similarly, if the requester indicated a high level of satisfaction for previous interactions with a certain expert, the same expert may be preferred for new requests from the same requestor as well. Additional or similar requestor attributes may be gathered from other sources 1448, 1452 and 1454 as well using a suitable method to establish communication with the requestor 1448, remote data sources 1452 and external data sources 1454. So to determine level of expertise, for example, queries can be directed to academic records, professional profiles and certificates of the requestor from 3rd parties. Similarly, human resource records can be accessed and demographic records may be accessed to determine language and other preferences. Queries to external sources 1454 include, for example, conducting an Internet search on the requestor to reveal areas of expertise, level of education and etc. Similarly, accessing and analyzing other indirect data sources may prove sufficient for deriving attributes. These indirect data sources may include, for example, third party certifications, academic records, records of previous experts that have interacted with the requester, publication records related to the requester, requestor demographics, human resources (HR) skills and competencies, as well as any organizational affiliations (e.g., university or enterprise, line of business within enterprise) to which the requestor may belong. Also, the requestor's physical location may provide key attributes, as well as the requestor's social and professional status and position. For example, the requester may be an important executive in a corporation.

Preferably, the requester is queried 1448 last after collecting data from other sources 1450, 1452, 1454. Data about the requester or the request may be accessed by interacting directly with the requester, through e-mail, phone, chat or any other suitable channel. This may validate the current request/requestor profile, as well as provide attribute values that may be missing and that might not be obtained otherwise. The degree of interaction with the requester may vary depending upon the interaction required to fill in essential attributes. For example, the requestor may be asked to supply the domain, if linguistic analysis fails to determine the domain and the level of expertise of the requestor. Also the requestor may be asked to fill out a form, specifically determining requestor attributes, such as level of expertise, request attributes, such as domain, and preferred response attributes, such as response time and medium (e-mail, live conversation, etc.). The requestor may be quizzed to determine expertise level, if this is not otherwise determined.

In step 1456 the attributes of the request/requestor pair are determined. Request/requestor pair attributes may include, for example, the domain of inquiry, an anticipated skill level of the requestor in this domain, an anticipated duration of the response, the response value to the requester (e.g., for value pricing). Interaction with various previously established attributes may be necessary to arrive at the attributes of a particular request/requestor pair. Policies, that may be learned over time, or suitable algorithms may be applied to readjust attribute values when combining request attributes with requestor attributes. Also, these policies and algorithms may be applied when request attributes and/or requestor attributes are inferred or, accessed from storage and then compared to values provided through requestor interaction. So, for example, if the request language is English, the expected language of the response as English. However, the requestor may be known as having a prior preference for Spanish. Thus, various policies may be applied, for example, since there are 2 different known preferences, and either (English and Spanish) may be assigned to the response. If the user is prompted for language preference in 1448, the user's response may override either or both of the requested language or the stored preference. Thereafter, in step 1458 the request/requestor profile computed in step 1456 is passed to the matching unit 132 for selecting a matching expert in step 146.

Figure 4:
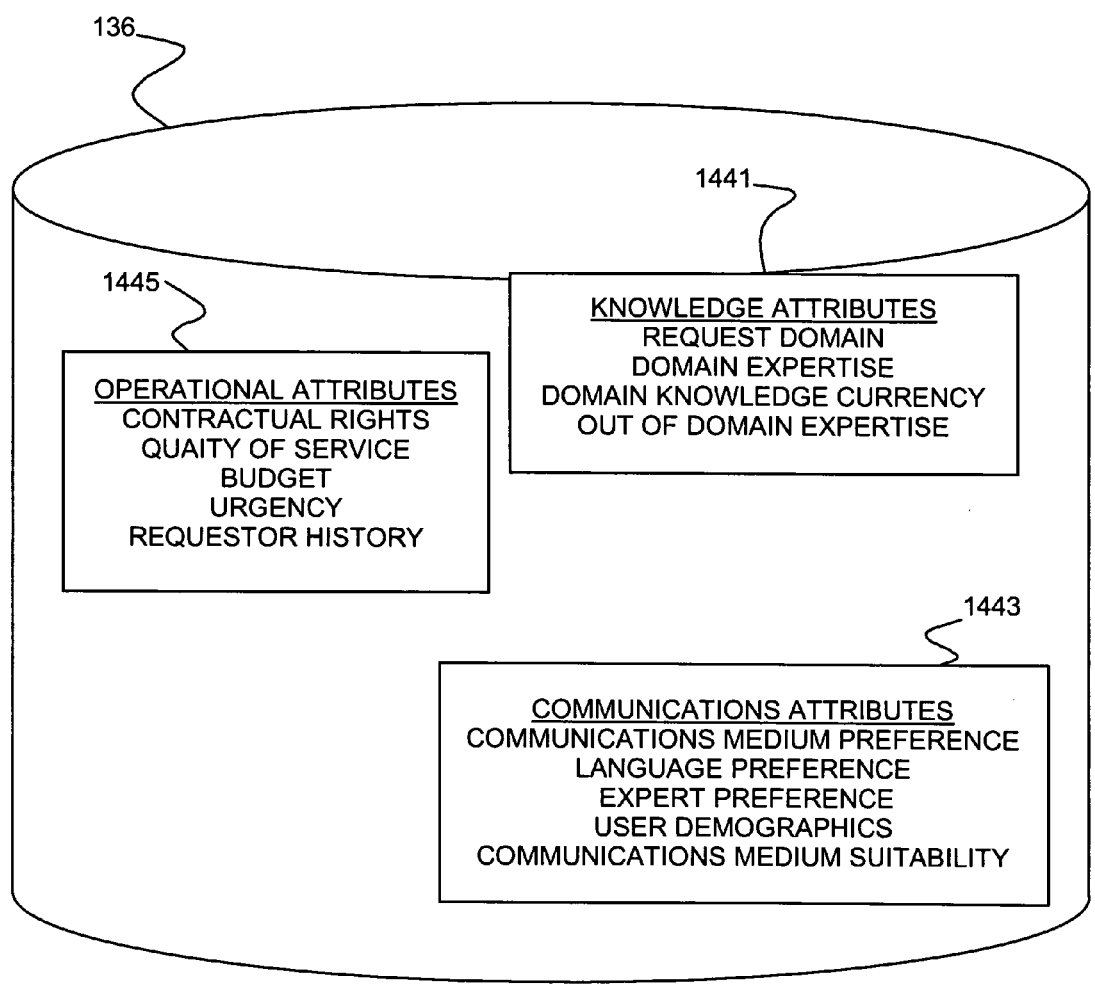
FIG. 4 shows an example of the request/requestor pair attribute data structure.

FIG. 4 shows an example of the request/requestor pair attribute data structure provided in step 144, e.g., according to the flow diagram example of FIG. 3, and stored as a flat file or with the requestor data 136 in FIG. 1, for example. Unlike previous approaches, the requestor is not treated as separate or independent from the request, and requestor attributes are considered in context of the request. Preferably, the request/requestor pair attributes fall into 3 categories—knowledge associated with the pair 1441; communications attributes of the requestor and the appropriateness of different modes of communications given the request 1443; and business attributes. These attribute categories may be implied by the nature of the request, by the contract of the payer, etc. Further, they may be elements of data store associated with the request/requestor pair, e.g., they may be extensible mark up language (XML) tagged attributes. The attributes of the request/requestor pair include static elements, as well as attributes, can be dynamically updated as requests are handled and information about them is made available. The requestor information may be distributed amongst connected computers and accessed remotely or locally, e.g., in 136 of FIG. 1. Additional information about the request may be acquired by analyzing the incoming request and by soliciting information from the requester, via forms, interviews or other means.

Knowledge attributes 1441 characterizing the knowledge associated with the request/requestor pair may include, for example, but are not limited to knowledge domain of the request, the requestor's level of expertise in domain, currency of requestor's knowledge in the domain and/or the requestor's level of expertise in other domains. The knowledge domain of the request indicates the domain to which the request can be categorized with respect to a selected classification scheme, such as a taxonomy of topics. Examples of such taxonomy include the Dewey Decimal System, the Library of Congress, a list of topics, or a Yahoo-like categorization. Each request may be associated with one or more classification scheme topics that may be a list, hierarchical (e.g., with each sub-node further determining the sub-domain of expertise), or follow any other suitable organizational scheme, organized to facilitate the matching. The requestor's level of expertise in related domains is an indication of the degree of the requestor's knowledge of the particular request domain(s) or topic(s) and may be provided in terms of formal attributes, e.g., academic degree, current professional position, membership in domain associations or other bodies indicative of certain authority in a field, number and quality of publications in the area, relevant patents, work experience, etc. Further the level may be determined using, for example, an Internet search to determine the number and range of publications, or a patent search, or other searches to determine membership in professional organizations. Alternately, the level may be inferred from the structure of the request or be determined directly from requestor input. For example, requestors may be asked to rank themselves as to expertise level, or the system may use the results of a pre-test to determine their level. Currency of requestor's knowledge is an indication of the temporal aspect of the expertise and may include, for example, most recent date of any publications authored by the requestor, most recent patent issuance, any current memberships in related professional organizations. The requestor's level of expertise in other domains can also facilitate optimizing the match. If, for example, a requestor is an expert in a related field (e.g., knows C# but not Java, the domain of the request), that requestor is matched differently than a requestor that is expert in an unrelated field (such as communications, when the domain of the request is Java).

The communications attributes of the request/requestor pair 1443 may include, for example, but are not limited to the request language and preference attributes specifying requestor preferences, e.g., whether the medium is written, oral, chat, email and, etc. In addition, the requestor may provide an expert preference with the request, either for a known expert (e.g., one who gave a good answer in the past), or for any expert that matches certain expert attributes. User demographics, such as the requestor's gender, age, level of education, income or any other obtainable information that can be used either directly or indirectly to affect the match, also may be included. For example, if the requestor is a child, the expert should be a person who can explain the answer to a child. Indirectly inferred characteristics for a match are, preferably, validated explicitly with requestor input and may include, for example, the location of the requestor. If the requestor is located in Japan, for example the inference is that the preferred language is Japanese. Communications medium suitability selects the most suitable medium for conveying the answer based on characteristics of the request/requestor pair. For example, if the requestor is a child and the request is about mammals, the most suitable medium may be a combination of graphics and audio message to minimize reading comprehension mismatches.

Operational attributes 1445 characterize the operation from the perspective of the request/requestor pair. Such operational attributes 1445 may include, for example, contractual rights, Quality of Service (QoS) and budgetary considerations. Contractual rights may determine the type of operation to which the requestor is entitled. For example, the requester may be a subscriber with unlimited access to experts or have access to multiple experts for the same request with one expert verifying the answer of another. Typically, QoS specifies the level of service guaranteed to the requestor e.g., assuring an answer within the hour. Budgetary considerations may determine how and how much the requestor is to pay for the answer. Even with contracts and QoS agreements in place, the budget may vary since it is associated not just with the requester, but with the request/requestor pair. Operational attributes 1445 may indicate how urgently the requestor needs an answer or how long the requestor will wait. As with budgetary considerations, urgency can vary from one request/requestor pair to another. Also, the requestor's request history may be stored as an aggregation of all attributes of previous request/requestor pairs for each requestor and may facilitate improved matches. For example, if the request/requestor pair history shows a clear requestor preference for a particular expert, that particular expert may be a preferred match if available for requests by that requestor and within the same domain.

Figure 5:
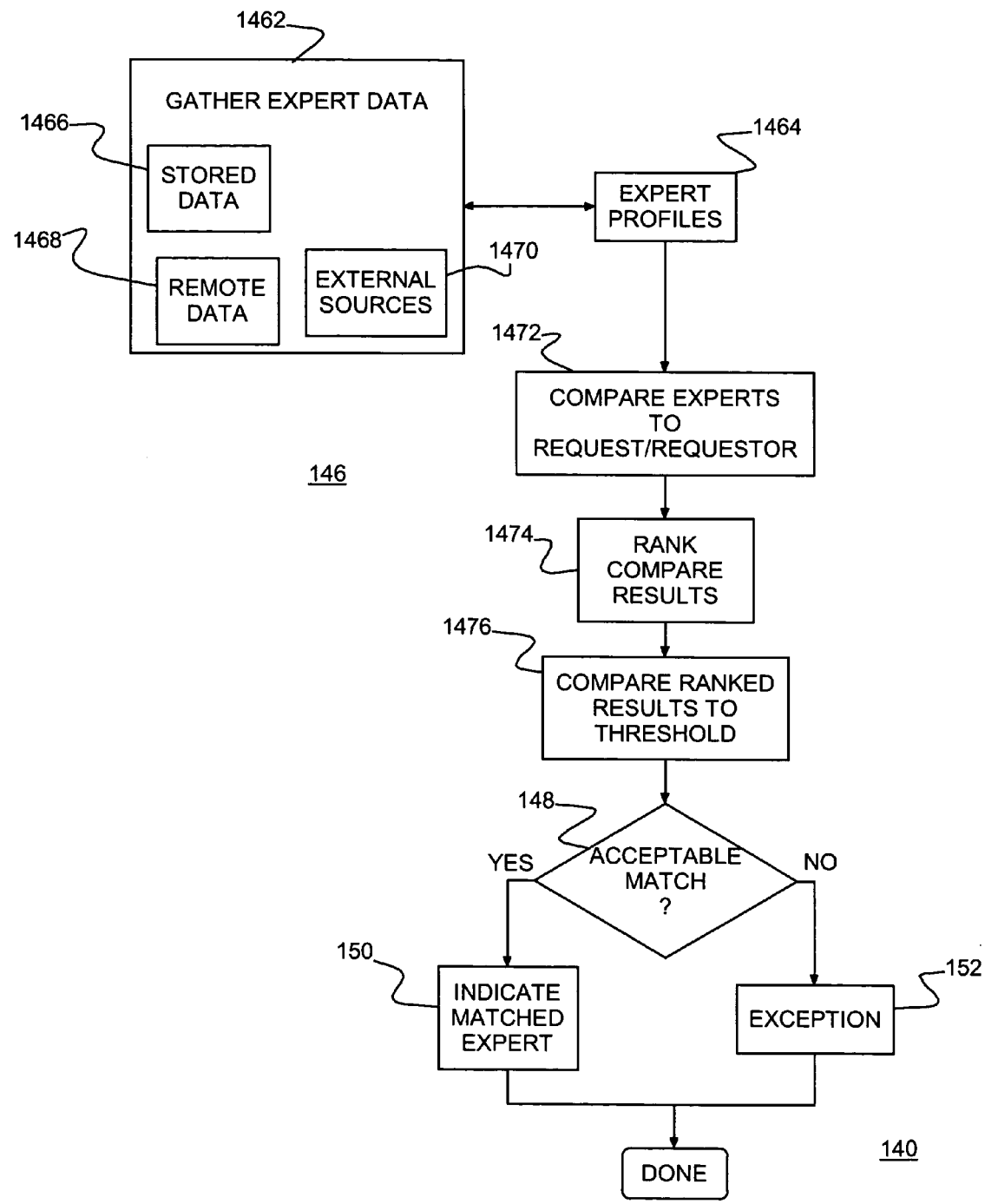
FIG. 5 shows a flowchart example of selecting a matching expert, wherein experts are compared against the extracted attributes.

FIG. 5 shows a flowchart example of selecting a matching expert such as in step 146 of FIG. 2, wherein experts are compared against the request/requestor attributes in matching unit 132 in the example of FIG. 1. Beginning in step 1462, data is gathered about potential experts, including, e.g., accessing locally stored data 1466 or remote data source 1468 or mining external data sources 1470. Experts are evaluated in response to the attributes provided in step 1458 of FIG. 3. Preferably, the evaluation includes, for example, but is not limited to, information about language, location, degrees, academic record, publications, certifications, competencies, average response time, customer satisfaction from previous inquiries, reputation (e.g., as used for sellers and buyers on Ebay (www.ebay.com), specialty, recent assignments, availability, utilization measurements, pay rate, contractual agreements, time since last query, business associations (e.g., on the board of IBM) or security clearance. Further, the match may be evaluated, for example, but is not limited to, evaluating technical, communication and personal aspects of the match. Optionally, a threshold may be set for determining a satisfactory match. In step 1474, when more than one expert is found, the evaluation results may be optimized for cost, price, customer satisfaction, minimizing bench time and/or value of response. Further the evaluation may be constrained for maximum service times (e.g., no overtime this week) and/or maximum costs. This expert ranking may be done using a suitable method of determining a feasible solution to a mathematical optimization problem, e.g., solved using known heuristic methods or commercially available mathematical optimization software.

In step 1464 all expert profiles are accessed and compared to request/requestor pair in step 1472. In the simplest example, the expert attributes are stored, locally, e.g., in expert database 138 in FIG. 1, for access in 1466. In a more complex example, attributes stored in the expert database 138 are supplemented with information from remote data sources 1468 and/or from external sources 1470, similar to gathering requestor data in step 1446. Suitable policies or algorithms may be used to resolve potential conflicts among the information sources. For example, if publications by the expert appear in an Internet search but are not listed in the system, they may be added to the expert profile. Also, a lower confidence level may be associated with information inferred or identified by mining external sources 1470. Optionally, experts may be allowed or required to validate/update their profiles periodically. If this option is included, each piece of information may have a time/date stamp indicating when the particular attribute was added to the profile or last updated.

Expert profiles are compared with the request/requestor pair attributes, e.g., using any suitable matching algorithm, policy or heuristics. Preferably, each expert profile is compared against the request/requestor pair attributes one attribute at a time to establish a threshold for a successful match for each attribute. For example, if English is preferred for the request/requestor pair and also is a language of competency in an expert profile, the match on this attribute is 100% successful. If, however, English is acceptable for the request/requestor pair (say, second in preference to Spanish), the attribute match is 50%. On the other hand, if English is unacceptable for the request/requestor pair but is the only language for the expert, the language attribute match fails. Rules establish which attributes are required for a successful match (e.g., a common language may be a must, as is knowledge of the request domain by the expert) and which attribute matches are only preferred (e.g., geographical preference or maximal cost). Comparing step 1472 may be complete and so, may stop after at least one expert match is found. However, the first identified acceptable match is not necessarily the best. So, preferably, the comparison step 1472 proceeds to evaluate all experts, determining a degree of matching success to each and lists all matches, e.g., those experts that meet a defined absolute minimum or minimum qualification set or required conditions. So, for example, minimum expert requirements for a match may include expertise in computer science and a particular computer language, while optional requirements may include language proficiency, proficiency in a particular application domain, industry experience and real time experience.

In step 1474 the comparison results are ranked by order of match success. In 1476 the comparison results are compared against a pre-established threshold and, those expert profiles whose success match is lower than the established threshold are removed from the list. In step 148 if at least one expert profile remains in the list after step 1476, the list is returned in step 150. If no expert profiles remain in the list (i.e., either no matches were found in step 1472 or all were removed in step 1476), an appropriate indication is returned in step 152 to invoke exception handling.

Preferably, servicing the requests provides additional information to be used in future profile matching. Information obtained from servicing each request includes, for example, but is not limited to customer satisfaction, expert satisfaction, length of service time, expert notations regarding this customer, and may be stored in flat files or structured databases, that may be geographically distributed or centrally located. Information on disparate experts and disparate requesters may be aggregated for guidance for future matching, e.g., filtering the list of experts, for re-ranking the list, for preferentially selecting one sub-optimal expert based on a specific override rule and etc. For example, a requester with low satisfaction with a previous expert may be re-matched to a new expert.

Figure 6:
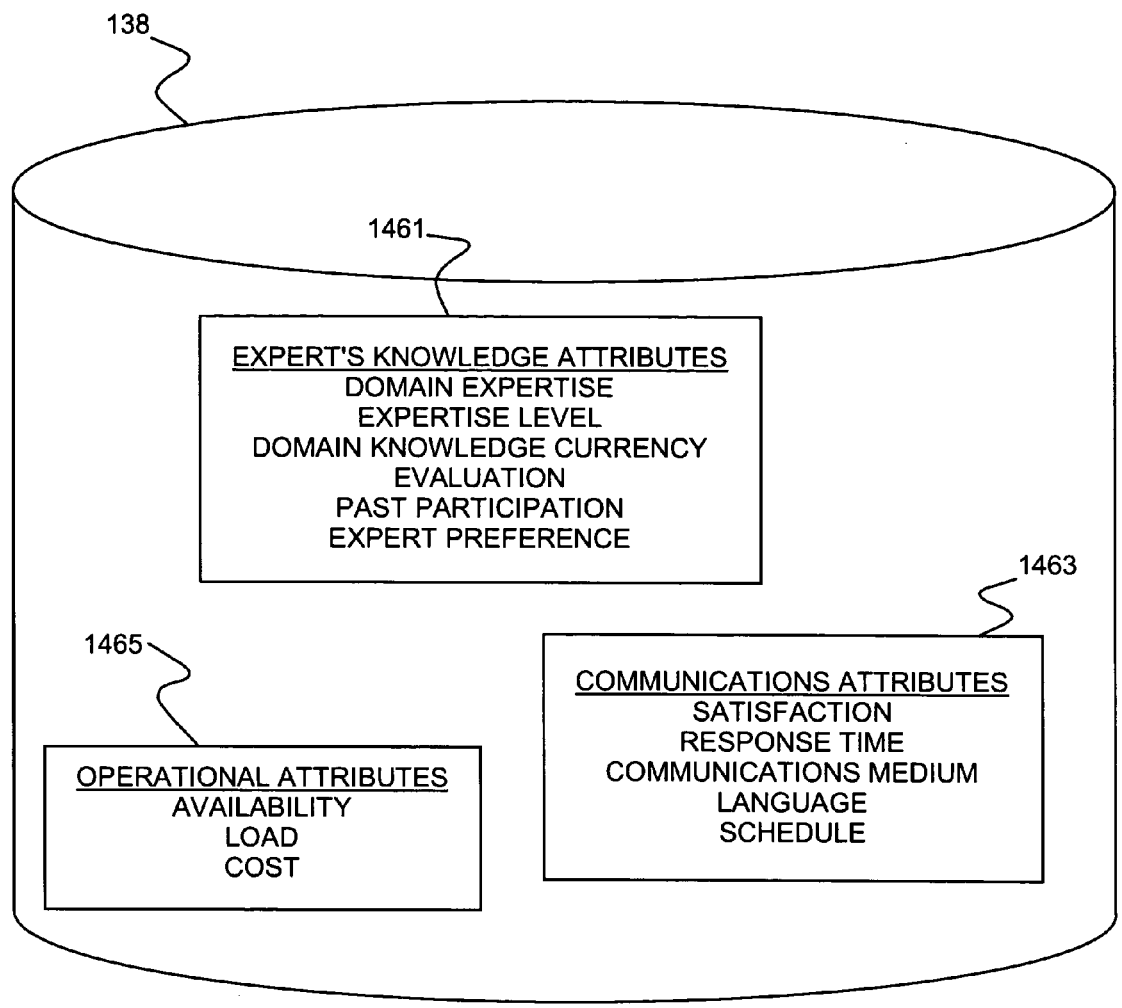
FIG. 6 shows an example of the expert attribute data structure.

FIG. 6 shows an example of the expert attribute data structure used in step 146, e.g., according to the flow diagram of FIG. 5, and that may be stored as a flat file or with the expert data 138 in FIG. 1, for example. Preferably, the expert information includes information about the knowledge of the expert 1461, information about the communications skills and capabilities of the expert 1463 and information about the business mode of operation of the expert 1465. Similarly, these categories may be elements of data store associated with the expert, e.g., they may be extensible mark up language (XML) tagged attributes. Information may be statically assigned to any of these attribute categories 1461, 1463, 1465 or assigned and dynamically updated as experts handle requests and information about the requests is available. Further, experts and/or administrators may also update these attributes at any time.

Attributes characterizing an expert's knowledge 1461 may include, for example, the domain of expertise, the expert's level of expertise, the expert's currency of knowledge, an evaluation of the expert's prior successes, and the expert's extent of participation as well as the expert's preferences. The domain of expertise may be defined with respect to a taxonomy of topics. For example, such a taxonomy may include the Dewey Decimal System, the Library of Congress list of topics, or a Yahoo-like categorization. The domain may be organized with any suitable organization that facilitates matching including a list or a hierarchical organization, e.g., with each sub-node further defining as sub-domain of expertise. Also, any expert may be associated with one or more topics in such a scheme. The expert's level of expertise may define the degree to which the expert is knowledgeable of the particular domain or topic. This level can be provided in formal attributes, e.g., academic degree, current professional position, membership in domain associations or other bodies indicative of certain authority in a field, number and quality of publications in the area, relevant patents, work experience, and etc. The expert's currency of knowledge may be considered to consider the temporal aspect of the expertise. Such currency may include, for example, how current the expert in a particular field, the most recent date of publication by the expert, the most recent date of any patent issued to the expert, and/or the expert's current memberships in professional organizations. An evaluation of the expert's success may be included, for example, peer jurying of professional history in the field of expertise, grades obtained in recent courses contributing to the expertise, feedback from co-workers, and etc. Also, the expert's extent of participation may be included to quantitatively measure the level of the expert's previously exhibited knowledge. This measurement may include, for example, how many requests were answered and/or how long the expert has been contributing to the system. Currency, level and evaluation may be calibrated with respect to extent of participation. Each of these measures may be dynamically updated as the expert interacts with the system. For example, continuous evaluation by peers may change the Evaluation determination. Further, a level of confidence may be associated with each attribute. and increased, for example with greater participation by the expert.

Expert communications attributes 1463 may describe, e.g., the expert's skills, capabilities and preferences and may include, for example, but are not limited to requestor satisfaction and response parameters, e.g., response medium, response language and average response time, as well as the expert's schedule. The level of satisfaction may be provided by past requestors who have used the expert and can be measured in any suitable way, e.g., from voluntary or mandatory feedback or by taking user surveys. The response medium reflects the expert's preferred answering modes and may include, for example, but are not limited to written (by e-mail, chat or other), oral (dictated, by phone, or face-to-face if possible) or any other acceptable response medium. Response language reflects those spoken languages that the expert understands or, in which the expert can answer. The expert's schedule may reflect the time and frequency in which the expert prefers to address requests, e.g., in the morning, after hours, once a week and etc. These schedule preferences may be expressed categorically (e.g., daily 5:00-7:00 pm) or as ranked preferences and using any suitable available weighting scheme to describe the different alternatives (e.g., a strong preference for English and weaker preference for Spanish). Although described hereinabove as the expert's preferences, these attributes may also be designated by the system (e.g., 100 of FIG. 1), by the matching service, or by contractual obligations on the part of the expert, i.e., the schedule can be determined by the system, service or contract, rather than by the preferences of the expert.

Operational attributes 1465 characterizing the expert's operation may be determined algorithmically, continuously regenerating the attributes that may include, for example, but are not limited to expert availability, the expert's workload, the expert's time zone location, and/or load and cost. Preferably, expert availability is determined dynamically, e.g., by an algorithm applied to the expert's schedule attributes, which are included in communications attributes 1463 and, also, based on the expert's current workload. The expert's workload is an indication of the expert's current activity, e.g., how many requests the expert is currently handling and how far along the expert is on each response. Similarly, workload (or another attribute) may also indicate idleness, i.e., elapsed time since handling of last query. For a single in progress request example, the load associated with the in progress request may be highest when the expert is answering the request; significantly decrease when the answer is sent out to the requestor but the request is still held open, e.g., the requestor may have follow-up questions or need for clarification; and, drop to zero when the requestor indicates satisfaction or closure. The cost of using the expert may be measured in any of a number of ways, such as, for example, how much is going to be charged or how much the expert will receive for the answer. Further, cost may be based on a fixed rate (e.g., $/hr), or dynamically established, e.g., using online bidding. A fixed rate may be further derived from other attributes, e.g., schedule, level of knowledge and etc. Changing circumstances may vary the cost, e.g., the demand for accountants rises sharply at tax time or engineering information is particularly important at critical times during a project. In this example, especially where more than one expert is able to respond to a particular request, costs associated with each particular expert may be considered to ensure optimal selection/allocation of expertise. Dynamically established costs may include participation by the requester and or the expert, as in bidding, or by online agents. Also, to facilitate load balancing, cost can also be determined dynamically without involving the requester, expert or their agents, e.g., using an algorithm that, for example, pays the expert more if the expert's workload increases.

Thus, advantageously, an optimal expert is selected to respond to each request/requestor pair, thereby minimizing waste of valuable knowledge management system resources. Resource waste is minimized because a preferred embodiment knowledge management system examines and considers the qualifications and/or attributes of the request and requestor with respect to available experts to provide a more satisfying and effective interaction/match. The request/requestor attributes are matched with experts, educational materials, and/or sources of educational materials, including physical parameters (e.g., location and time zone), expertise (e.g., specialty and degrees), availability (e.g., current workload) and CRM related attributes (e.g., languages spoken, customer satisfaction measures), value of the expert's time (e.g., cost). Further, the attributes of a request/requestor pair are determined to select a best match for each incoming request to an appropriate expert, e.g., using suitable algorithms that consider cost/price, differences in level of expertise, load balancing across experts, contractual obligations, etc.

While the invention has been described in terms of preferred embodiments, those skilled in the art will recognize that the invention can be practiced with modification within the spirit and scope of the appended claims.

What is claimed is:

1. A computer implemented knowledge management system allocating expert resources, said knowledge management system comprising:

a plurality of devices communicating information requests from associated requestors;

expert data storage storing expert data in an expert database;

requestor data storage storing data on said associated requestors in a requestor database; and a pairing unit pairing information requests with appropriate experts, said pairing unit determining an associated requestor for each incoming request, matching both requestor data for said associated requestor and said incoming request with expert data for available experts, and selecting an appropriate expert from said available experts;

said pairing unit comprising:

a request/requestor characterization unit determining request/requestor attributes characteristic of said each incoming request;

said request/requestor characterization unit comprising:

means for determining request attributes for said each incoming request;

means for determining requestor attributes for said determined requestor; and means for gathering request and requestor data, gathered said request data being provided to said means for determining request attributes and gathered said requestor data being provided to said means for determining requestor attributes;

a matching unit comparing said determined request/requestor attributes with said expert data for said available experts, said appropriate expert being selected responsive to the comparison results; and a routing unit routing said each incoming request to a selected expert.

2. A knowledge management system as in claim 1, wherein said means for gathering request and requestor data gathers said data from said requestor database and from remotely stored data.

3. A knowledge management system as in claim 1, wherein said means for gathering request and requestor data further comprises:

means for querying said requestor for said request and requestor data.

4. A knowledge management system as in claim 1, wherein said matching unit comprises:

means for ranking compared said expert profiles; and means for comparing ranked said expert profiles against a minimum acceptance threshold, any said ranked expert profiles above said minimum acceptance threshold being an acceptable match to said incoming request and said determined requestor.

5. A knowledge management system as in claim 4, wherein said means for ranking ranks experts based on expert operational attributes.

6. A knowledge management system as in claim 5, wherein said matching unit dynamically determines expert availability, said expert operational attributes including dynamically determined expert availability.

7. A knowledge management system as in claim 1, wherein said matching unit comprises:
   a plurality of expert profiles, each of said plurality of expert profiles indicating at least one field of expertise and a level of said expertise in said field;
   means for gathering expert data, gathered said expert data being gathered from and included in said plurality of expert profiles; and
   means for comparing said expert profiles with request/requestor attributes for said each incoming request.

8. A knowledge management system as in claim 7, wherein said means for gathering expert data gathers said expert data from said expert database and from remotely stored data.

9. A knowledge management system as in claim 7, wherein said means for gathering expert data further comprises:
   means for querying a participating expert for said expert data.

10. A knowledge management system as in claim 1, wherein said routing unit provides said associated requestor with a list of experts and contact information for each listed expert, whereby said associated requestor may select an expert from said list and contact said selected expert.

11. A knowledge management system as in claim 1, further comprising:
    a call termination point for voice over Internet protocol (VoIP) communications with said devices; and
    a call center providing data and voice communications with local communications devices, experts staffing said local communications devices.

12. A knowledge management system as in claim 1, wherein said plurality of devices communicate over a network comprising:
    a voice network; and
    a data network.

13. A computer implemented method of allocating expert resources in a knowledge management system, said method comprising the steps of:
    a) receiving an incoming request for information;
    b) determining request/requestor attributes for said incoming request;
       further comprising the steps of:
       i) determining request attributes;
       ii) determining requestor attributes; and
       iii) determining request/requestor attributes characterizing said incoming request and said requestor;
    c) searching available experts responsive to said request/requestor attributes; and
    d) routing said request to an identified one of said available experts.

14. A method of allocating expert resources as in claim 13, wherein the step (b) of determining said request/requestor attributes further comprises gathering request and requestor data, gathered said request and requestor data being used in the step (i) of determining request attributes and the step (ii) of determining requestor attributes.

15. A method of allocating expert resources as in claim 14, wherein gathered said request and requestor data gathered in the step (b) of determining request/requestor attributes further are gathered from locally stored request/requestor data, from remotely stored request/requestor data, from data mining and from responses to request/requestor attribute related questions.

16. A method of allocating expert resources as in claim 13, wherein said request/requestor attributes comprise knowledge attributes, operational attributes and communications attributes.

17. A method of allocating expert resources as in claim 16, wherein said knowledge attributes indicate requestor knowledge in and out of the request domain, operational attributes include requestor operating constraints for the request and communications attributes indicate communications preferences for communications between said requestor and an identified said expert.

18. A method of allocating expert resources as in claim 13, wherein the step (c) of searching available experts comprises the steps of:
    i) gathering data about said available experts;
    ii) combining gathered said data with expert profiles;
    iii) comparing said expert profiles against said request/requestor attributes; and
    iv) selecting a matching expert as said identified one.

19. A method of allocating expert resources as in claim 18, wherein gathered said data are gathered from locally stored expert data, from remotely stored expert data and from data mining.

20. A method of allocating expert resources as in claim 18, wherein said expert attributes comprise knowledge attributes, operational attributes and communications attributes.

21. A method of allocating expert resources as in claim 20, wherein said knowledge attributes indicate expert knowledge in and out of the request domain, operational attributes indicate expert operating conditions and communications attributes indicate expert communications capabilities for communications with said expert.

22. A method of allocating expert resources as in claim 20, wherein said expert operational attributes are dynamically determined responsive to expert availability.

23. A method of allocating expert resources as in claim 20, wherein said expert operational attributes comprise schedule workload, time zone location and cost.

24. A method of allocating expert resources as in claim 18, wherein the step (iv) of selecting said matching expert comprises the steps of:
    A) ranking comparison results from comparing step (iii); and
    B) comparing ranked said comparison results against a threshold, a highest ranked expert above said threshold being said identified one.

25. A method of allocating expert resources as in claim 24, wherein whenever in comparison step (B) all of said ranking comparison results are below said threshold, the comparing step further comprises providing an exception indicating that a matching expert has not been identified.

26. A method of allocating expert resources as in claim 18, wherein the step (d) of routing said request comprises:
    (i) providing a list of experts and contact information for each listed expert;
    (ii) selecting an expert from said list; and
    (iii) contacting said selected expert.

27. A method of allocating expert resources as in claim 18, wherein whenever a matching expert is not found in searching step (c), an exception is routed in routing step (d) to an originating requestor indicating that a matching expert has not been identified.

28. A computer program product for allocating expert resources in a knowledge management system, said computer program product comprising a computer usable medium having computer readable program code thereon, said computer readable program code comprising:

computer readable program code means for receiving an incoming request for information;

computer readable program code means for determining request/requestor attributes for each received said incoming request; and said computer readable program code means for determining request/requestor attributes, further comprising:

computer readable program code means for gathering attributes about incoming requests, requestors associated with said incoming requests and participating experts;

computer readable program code means for storing and maintaining requestor attributes responsive to gathered said attributes; and computer readable program code means for storing and maintaining expert attributes responsive to gathered said attributes;

computer readable program code means for determining attributes unique to both said incoming request and said requestor.

computer readable program code means for selecting a most appropriate expert from a plurality of available experts responsive to determined said request/requestor attributes.

29. A computer program product for allocating expert resources in a knowledge management system as in claim 28, wherein said computer readable program code means for gathering said attributes gathers said attributes from locally stored attributes, from remotely stored data, from data mining and from responses to attribute related questions.

30. A computer program product for allocating expert resources in a knowledge management system as in claim 28, wherein said attributes include:

knowledge attributes indicating knowledge in and out of a domain associated with a corresponding said incoming request;

operational attributes indicate operating constraints for the request; and communications attributes indicate communications preferences for communications between with an identified said expert.

31. A computer program product for allocating expert resources in a knowledge management system as in claim 30, further comprising computer readable program code means for dynamically determining said operational attributes about said participating experts.

32. A computer program product for allocating expert resources in a knowledge management system as in claim 30, wherein said dynamically determined said operational attributes are determined responsive to expert schedule workload, expert time zone location and cost of using each said expert.

33. A computer program product for allocating expert resources in a knowledge management system as in claim 28, said computer readable program code further comprising:

computer readable program code means for determining attributes unique to each said incoming request and an originating requestor.

34. A computer program product for allocating expert resources in a knowledge management system as in claim 28, wherein said computer readable program code for selecting a most appropriate expert comprises:

computer readable program code means for comparing said expert profiles with said request/requestor attributes;

computer readable program code means for ranking compared said expert profiles; and computer readable program code means for comparing ranked compared said expert profiles with a threshold.

35. A computer program product for allocating expert resources in a knowledge management system as in claim 28, said computer readable program code further comprising:

computer readable program code means for providing a list of experts and contact information for each listed expert, whereby an associated requestor may select an expert from said list and contact said selected expert.

36. A computer program product for allocating expert resources in a knowledge management system as in claim 28, said computer readable program code further comprising:

computer readable program code means for routing said request to an identified one of said available experts.

\* \* \* \* \*